United States Patent [19]

Sokolowski

[11] Patent Number: 4,591,254
[45] Date of Patent: May 27, 1986

[54] ADAPTOR FOR T.V. CAMERA

[76] Inventor: Bronislaw Sokolowski, 44 Aldrich St., Webster, Mass. 01570

[21] Appl. No.: 665,281

[22] Filed: Oct. 26, 1984

[51] Int. Cl.$^4$ .............................................. G03B 13/02
[52] U.S. Cl. ..................................... 354/223; 358/224
[58] Field of Search ......................... 354/223; 358/224; 352/244

[56] References Cited

U.S. PATENT DOCUMENTS 3,913,116  10/1975  Kastner et al. ........................ 354/223
3,931,630   1/1976  Crawford .......................... 354/223 X
4,389,675   6/1983  Suzuki et al. ..................... 358/224 X

*Primary Examiner*—Michael L. Gellner
*Attorney, Agent, or Firm*—Blodgett & Blodgett

[57] ABSTRACT

Adaptor for a video movie camera having a detachable viewfinder which extends laterally from one side of the camera for viewing with the eye of the user which is closest to the camera. The viewfinder is provided with a first fastening element which is adapted to engage a second fastening element on the camera. The adaptor is provided with a third fastening element at one end of the adaptor for engaging the second fastening element of the camera and a fourth fastening element at the opposite end of the adaptor for engagement by the first fastening element of the viewfinder to enable the viewfinder to be detachably mounted on the adaptor for viewing with the eyes of the user which is farthest from the camera.

8 Claims, 9 Drawing Figures

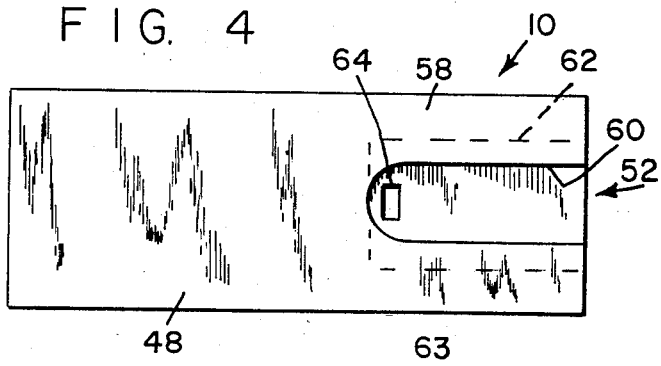
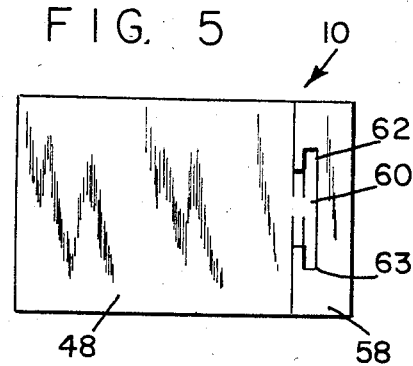
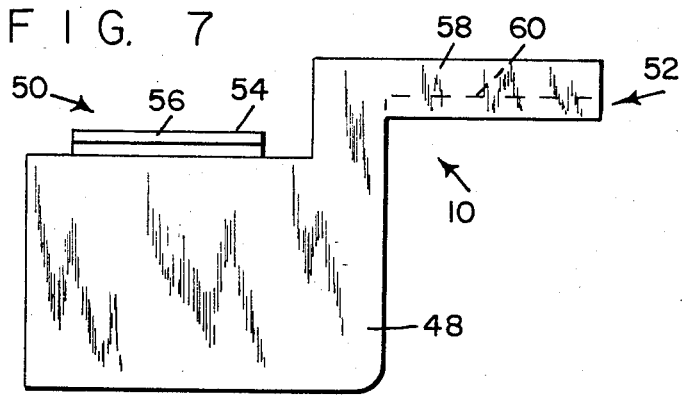
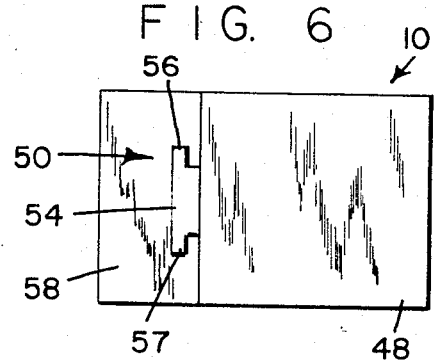
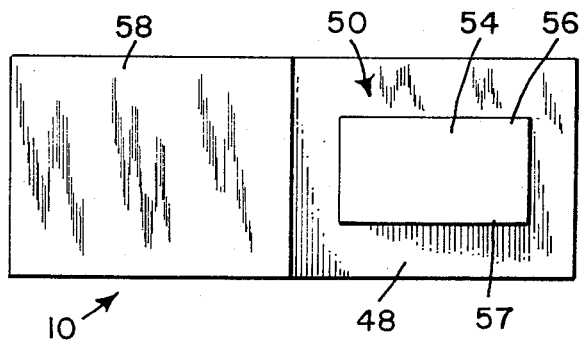
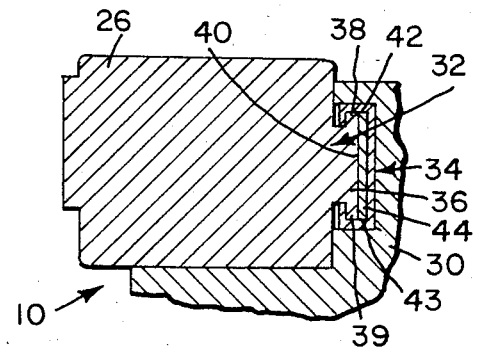

ADAPTOR FOR T.V. CAMERA

BACKGROUND OF THE INVENTION

The present invention is directed generally to an improvement in the viewfinder portion of a T.V. camera and more particularly to an adaptor for a T.V. camera which enables the viewfinder to be used selectively with either eye of the user.

Most present day T.V. cameras are adapted to be supported on the user's shoulder so that the camera, as a whole, extends along the side of the user's face. The present day cameras are also equipped with an electronic viewfinder which extends laterally from the main body of the camera so that it can be viewed with the eye which is closest to the camera. The camera is made so it is supported on the right shoulder of the individual and viewed with the right eye. In this regard, the camera is primarily designed for right-handed individuals that can be used by left-handed individuals as well.

A major problem with the type of camera described above is that it is difficult, and, in some cases, impossible to be used by many individuals because the viewfinder can only be viewed with the right eye. As in the case of right and left-handedness, most individuals have a dominant eye and find it difficult to use the viewfinder if their dominant eye happens to be the left eye. For other individuals, the problem is more serious. In some cases, the individual may have poor vision in his or her right eye or no vision at all in the right eye, making it impossible for the individual to use the camera. Therefore, a substantial segment of the population is excluded from using the T.V. camera of the type described above and another segment of the population finds the camera difficult to use. A possible solution to this problem is to provide a camera which is designed to rest on a person's left shoulder with a viewfinder which can be viewed with the left eye. However, this solution is very expensive to the manufacturer and retailer of the camera and would result in a substantial increase in the cost of the camera.

It is, therefore, a principal object of the invention to provide an adaptor for a T.V. camera which enables the viewfinder of the camera to be used selectively with either eye of the user.

Another object of this invention is the provision of an adaptor for a T.V. camera which enables a viewfinder to be used with either eye of the user and which requires no modification of the existing camera.

A further object of the present invention is the provision of an adaptor which is simple in construction, which is inexpensive to manufacture, and which is extremely easy to use.

With these and other objects in view, as will be apparent to those skilled in the art, the invention resides in the combination of parts set forth in the specification and covered by the claims appended hereto.

SUMMARY OF THE INVENTION

In general, the invention consists of an adaptor for a video movie camera having a detachable viewfinder which is provided with a first fastening element that is adapted to engage a second fastening element on the camera to enable the viewfinder to be detachablly mounted on the camera. The adaptor comprises a supporting body having a third fastening element at one end of the body and a fourth fastening element at the opposite end of the body. The third fastening element is adapted to engage the second fastening element of the camera and a fourth fastening element is adapted to engage the first fastening element of the viewfinder.

BRIEF DESCRIPTION OF THE DRAWINGS

The character of the invention, however, may be best understood by reference to one of its structural forms, as illustrated by the accompanying drawings, in which:

FIG. 4 is a front elevational view of the adaptor, FIG. 5 is a right-hand elevational view of the adaptor, FIG. 6 is a left-hand elevational view of the adaptor, FIG. 7 is a plan view of the adaptor, FIG. 8 is a rear elevational view of the adaptor, and FIG. 9 is a vertical cross-sectional view similar to FIG. 2 showing the viewfinder in its normal position, mounted directly on the camera.

THE DESCRIPTION OF THE REFERRED EMBODIMENT

Figure 1:
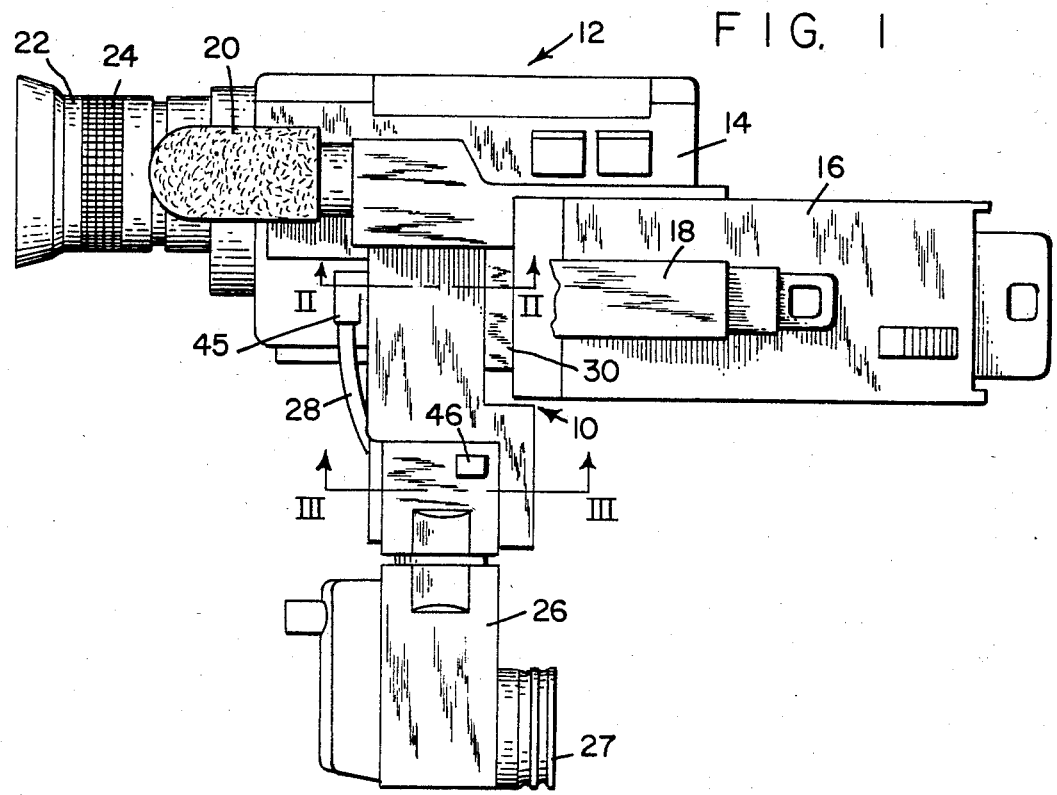
FIG. 1 is a plan elevational view of the adaptor of the present invention shown mounted on a T.V. camera.

Referring first to FIG. 1, the adaptor of the present invention is generally indicated by the reference number 10 and is shown applied to a T.V. camera, generally indicated by the reference numeral 12. Camera 12 is the type of camera which is adapted to be supported on the right shoulder of the user and comprises a housing 14, a cassette holder 16 and a handle 18 which is located on the top of the housing and adapted to be held by the user's right hand. The front of the camera is provided the a microphone 20, a lens housing 22, and a focus ring 24. In the absence of the adaptor 10, an electronic viewfinder 26 is adapted to be mounted on a viewfinder holder 30. The holder 30 is located in front of the cassette holder 16 so that the viewfinder 26 extends laterally of the camera. The viewfinder 26 has a rearwardly extending eye piece 27 which is adapted to be viewed by the user's right eye. The viewfinder 26 is electrically connected to the camera by means of a viewfinder cable 28. However, as shown in FIG. 1, when the adaptor 10 of the present invention is utilized with the camera, the adaptor 10 is mounted on the viewfinder holder 30 and the viewfinder 26 is mounted on the adaptor.

Referring in particularly to FIG. 9 the viewfinder 26 is adapted to be removably mounted on the viewfinder holder 30 by means of a first fastening element, generally indicated by the reference numeral 32, on the viewfinder 26 and a second fastening element, generally indicated by the reference numeral 34, on the viewfinder holder 30. The first fastening element 32 comprises a protrusion 36 which is provided with upper and lower oppositely extending flanges 38 and 39, respectively. The second fastening element 34 comprises a slotted slideway 40 which has upper and lower oppositely extending grooves 42 and 43, respectively. The slideway 40 is adapted to receive the protrusion 36 so that the upper and lower flanges 38 and 39 respectively extend into the upper and lower grooves 42 and 43, respectively. A leaf spring 44 is located in the slideway 40 so that the flanges 38 and 39 are maintained in the grooves 42 and 43 in a tight, sliding fit. The slideway 40 is also provided with an aperture, not shown, for receiving a spring loaded latch, not shown, in the viewfinder to lock the viewfinder to the viewfinder holder 30. The viewfinder 26 is withdrawn from the viewfinder holder 30 by depressing a viewfinder release button 46 which is effective to withdraw the latch from the aperture in the viewfinder 30. The viewfinder cable 28 is electrically connected to the camera by means of a connector 45. The connector 45 is plugged into the camera and can be removed to enable the viewfinder to be completely removed from the camera.

Figure 2:
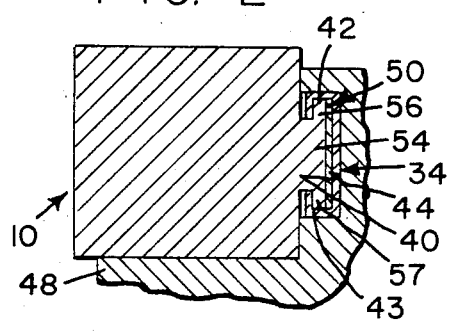
FIG. 2 is a vertical cross-sectional view of the adaptor taken on the line II—II of FIG. 1.
Figure 3:
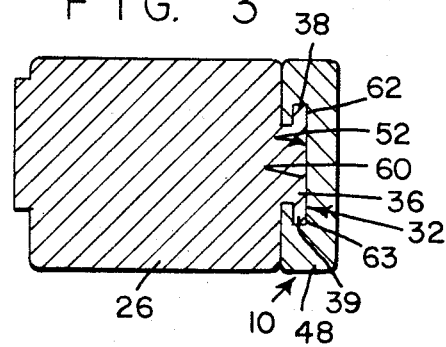
FIG. 3 is a vertical cross-sectional view of the adaptor taken on the line III—III of FIG. 1.

Referring particularly to FIG. 4–8, the adaptor 10 of the present invention comprises an elongating supporting body 48 which is provided with a third fastening element at one end of the main body portion and a fourth fastening element at opposite end of the main body portion. The third fastening element is generally indicated is by reference numeral 50, and a fourth fastening element is indicated by the reference numeral 52. A third fastening element 50 comprises a protrusion 54 which is provided with oppositely extending upper and lower flanges 56 and 57, respectively. Protrusion 54 is identical to the protrusion 36 so that the protrusion 54 can be inserted into the slideway 40 of the viewfinder holder as shown in FIG. 2 to enable the adaptor 10 to be removably mounted on the holder 30. The fourth fastening element 52 coomprises a slotted slideway 60 which is located in a narrow offset portion 58 of the main body 48. The slideway 60 is provided with oppositely extending upper and lower grooves 62 and 63, respectively. The slotted slideway 60 is identical to the slotted slideway 40 of the viewfinder holder 30, so that it is able to receive the protrusion 36 in a sliding fit as shown in FIG. 3. The slideway 60 is also provided with a aperture 64 for receiving the above described latch of the viewfinder 26 to lock the viewfinder 26 on the adaptor 10 when the protrusion 36 is inserted within the slideway 60.

The operation and the advantages of the present invention will now be readily understood in view of the above description. When the camera 12 is being used in the conventional mode by an individual who prefers to look into the viewfinder 26 with his or her right eye, the viewfinder 26 is mounted directly on the viewfinder holder 30. In this mode, the protrusion 36 which represents the first fastening element 32, is located in the slideway 40, which represents the second fastening element 34. The viewfinder 26 is locked in position on the holder 30 by means of the above described latching mechanism. However, if the individual cannot use his right eye for viewing or prefers to look into the viewfinder with his or her left eye, the adaptor 10 is utilized for left-eye viewing. Left-eye viewing is accomplished by removing the viewfinder from the viewfinder holder 30 by pressing the release button 46 and sliding the protrusion 36 out of the slideway 40. The viewfinder cable 28 may be left plugged in if desired. However, mounting of the adaptor is less awkward if the connector 45 is removed from the camera. After the removal of the viewfinder 26, the adaptor 10 is mounted on the viewfinder holder 30, by sliding the protrusion 54 into the slideway 40. Although the leaf spring 44 maintains the adaptor 10 snugly mounted on the viewfinder holder 30, it is comtemplated that the adaptor 10 can be provided with a latching mechanism similar to that of the viewfinder for locking the adaptor 10 on the holder 30.

The viewfinder 26 is then mounted on the adapter 10 by sliding the protrusion 36 into the slideway 60 so that the latch of the viewfinder extends into the aperture 64 and locks the viewfinder 26 on the adaptor 10. The connector 45 is then plugged into the camera to reconnect the viewfinder cable 28 to the camera. The camera 12 is now ready for left-eye viewing. The adaptor 10 enables the veiwfinder 26 to extend far enough away from the side of the camera so that when the camera is supported on the user's right shoulder the eye piece 27 of the viewfinder 26 is located in front of the user's left eye.

It is obvious that minor changes may be made in the form and construction of the invention without departing from the material spirit thereof. It is not, however, desired to confine the invention to the exact form herein shown and described but it is desired to include all such as properly come within the scope claimed.

Invention, having be thus described, what is claimed as new and desired to secure by letters patent is:

1. Adaptor for a video movie camera having a detachable viewfinder which is provided with a first fastening element that is adapted to engage a second fastening element on the camera to enable the viewfinder to be detachably mounted on the camera, the viewfinder extending laterally from one side of the camera for viewing with the eye of a person which is closest to said one side when the camera is being utilized for movie taking, said adaptor comprising:
(a) an elongated supporting body,
(b) a third fastening element which is located at one end of the body and which is adapted to engage said second fastening element to enable the adaptor to be detachably mounted on the camera, and
(c) a fourth fastening element at the opposite end of said body which is adapted to be engaged by said first fastening element for enabling the viewfinder to be detachably mounted on the adaptor for viewing with the person's opposite eye when the camera is being utilized for movie taking.

2. Adaptor for a video movie camera having a detachable viewfinder which is provided with a first fastening element that is adapted to engage a second fastening element on the camera to enable the viewfinder to be detachably mounted on the camera, the viewfinder extending laterally from one side of the camera for viewing with the eye of a person which is closest to said one side when the camera is being utilized for movie taking, said adaptor comprising:
(a) an elongated supporting body,
(b) a third fastening element which is located at one end of the body and which is adapted to engage said second fastening element to enable the adaptor to be detachably mounted on the camera, and
(c) a fourth fastening element at the opposite end of said body which is adapted to be engaged by said first fastening element for enabling the viewfinder to be detachably mounted on the adaptor for extending laterally from said one side of the camera and for viewing with the person's opposite end when the camera is being utilized for movie taking.

3. Adaptor for a video movie camera having a detachable viewfinder which is provided with a first fastening element that is adapted to engage a second fastening element on the camera to enable the viewfinder to be detachably mounted on the camera, the viewfinder extending laterally from one side of the camera for viewing with the eye of a person which is closest to said one side when the camera is being utilized for movie taking, said adaptor comprising:

(a) an elongated supporting body,
(b) a third fastening element which is identical to the first fastening element and which is located at one end of the body, said third fastening element being adapted to engage said second fastening element to enable the adaptor to be detachably mounted on the camera, and
(c) a fourth fastening element which is identical to the second fastening element and which is located at the opposite end of said body, said fourth fastening element being adapted to be engaged by said first fastening element for enabling the viewfinder to be detachably mounted on the adaptor for viewing with the person's opposite eye when the camera is being utilized for movie taking.

4. Adaptor for a video movie camera having a detachable viewfinder which is provided with a first fastening element that is adapted to engage a second fastening element on the camera to enable the viewfinder to be detachably mounted on the camera, the viewfinder extending laterally from one side of the camera for viewing with the eye of a person which is closest to said one side when the camera is being utilized for movie taking, said adaptor comprising:
(a) an elongated supporting body,
(b) a third fastening element which is located at one end of the body and which is adapted to be mechanically interlocked with said second fastening element to enable the adaptor to be detachably mounted on the camera, and
(c) a fourth fastening element at the opposite end of said body which is adapted to be mechanically interlocked by said first fastening element for enabling the viewfinder to be detachably mounted on the adaptor for viewing with the person's opposite eye when the camera is being utilized for movie taking.

5. Adaptor as recited in claim 4, wherein said fastening elements are mechanically interlocked by means of complementary flanges and grooves.

6. Adaptor as recited in claim 5, wherein each of the first and third fastening elements is a protrusion and each of the second and fourth fastening elements is a complementary slotted slideway for receiving the protrusions of said third and first fastening elements, respectively.

7. Adaptor as recited in claim 6, wherein each of said protrusions is provided with oppositely extending flanges and each of said slotted slideways is provided with oppositely extending grooves which are adapted to receive said flanges.

8. Adaptor as recited in claim 6, wherein said adaptor is provided with an aperture in said slideway for receiving a retractable plunger of a viewfinder which is provided with a retractable plunger to enable said viewfinder to be latched to said adaptor.

* * * * *